United States Patent [19]

Kalaskie et al.

[11] Patent Number: 4,706,929

[45] Date of Patent: Nov. 17, 1987

[54] PNEUMATICALLY OPERATED VALVE WITH MANUAL OVERRIDE AND LOCKOUT

[75] Inventors: William S. Kalaskie, McMurray; David E. Hughes, Pittsburgh, both of Pa.

[73] Assignee: Stanley G. Flagg & Co., Inc., Washington, Pa.

[21] Appl. No.: 938,824

[22] Filed: Dec. 8, 1986

[51] Int. Cl.[4] .......................................... F16K 31/143
[52] U.S. Cl. .......................................... 251/14; 92/23; 92/130 A; 137/316; 222/3; 222/504; 251/63.5; 251/335.2
[58] Field of Search ............... 251/62, 63, 63.5, 63.6, 251/14, 335.1, 335.2; 137/67, 68.1, 316, 522, 523; 92/13.6, 13.8, 15, 17, 23, 130 A; 222/3, 504

[56] References Cited

U.S. PATENT DOCUMENTS

| | | | |
|---|---|---|---|
| 948,445 | 2/1910 | Golden | 251/63.5 |
| 2,625,016 | 11/1953 | St. Clair | 222/3 |
| 2,663,153 | 12/1953 | Grant | 137/110 |
| 2,665,712 | 1/1954 | Pratt | 251/63.5 |
| 2,890,014 | 6/1959 | Luoma et al. | 251/14 |
| 3,410,518 | 11/1968 | Carsten | 251/31 |
| 3,706,323 | 12/1972 | Hayner et al. | 137/625.3 |
| 3,712,178 | 1/1973 | Hensley | 92/130 A |
| 3,884,251 | 5/1975 | Knight | 251/63.4 |
| 3,926,094 | 12/1975 | Kurichh et al. | 92/103 A |
| 4,077,422 | 3/1978 | Brinkley | 137/68.1 |
| 4,088,064 | 5/1978 | Tsunemoto et al. | 92/13.6 |
| 4,316,482 | 2/1982 | Pearce et al. | 251/63.6 |
| 4,335,744 | 6/1982 | Bey | 251/63.5 |
| 4,365,754 | 12/1982 | Levine et al. | 251/63.5 |
| 4,402,340 | 9/1983 | Lockwood, Jr. | 222/3 |
| 4,479,678 | 10/1984 | Sharp | 251/63.4 |
| 4,504,038 | 3/1985 | King | 251/63.5 |
| 4,523,516 | 6/1985 | Foster et al. | 251/63.6 |
| 4,582,082 | 4/1986 | Tossehini | 251/63.5 |

FOREIGN PATENT DOCUMENTS

| | | | |
|---|---|---|---|
| 514072 | 9/1952 | Belgium | 137/316 |
| 1269576 | 4/1972 | United Kingdom | 251/63.6 |

Primary Examiner—George L. Walton
Attorney, Agent, or Firm—Walter J. Blenko, Jr.; Richard V. Westerhoff

[57] ABSTRACT

A gas cylinder valve with an inner valve stem biased toward a valve open position by a helical compression spring is pneumatically operated by an actuator having a piston biased by a stack of disc springs against an outer valve stem, separated from the inner valve stem by a diaphragm gas seal, to urge the inner valve stem to a valve closed position. While the force exerted on the inner valve stem by the disc springs exceeds that applied by the helical spring so that the valve is normally biased closed, pneumatic pressure applied to the piston moves the piston away from the outer valve member so that the helical spring moves the inner valve stem to the open position. The valve may be manually opened without pneumatic pressure by screwing a threaded shaft into a boss on the piston, and while holding the shaft stationary with a handle provided, rotating a nut wrench threaded onto the shaft which bears against the actuator housing to draw the piston away from the outer valve stem against the bias of the spring discs so that the helical spring can move the inner valve stem to the open position. The valve is locked closed by a threaded plug which screws into the actuator housing and clamps the piston down against the outer valve stem with the inner valve stem in the closed position. The manually operable pneumatic actuator can be easily retrofitted to existing gas cylinder valves or can be provided as a part of new valves, and is of a size which permits it to be enclosed for transportation and storage by a conventional transport cap.

11 Claims, 5 Drawing Figures

PNEUMATICALLY OPERATED VALVE WITH MANUAL OVERRIDE AND LOCKOUT

BACKGROUND OF THE INVENTION

1. Field of the Invention

This invention relates to high pressure pneumatically operated valves and more particularly to such valves which can also be operated manually and can be locked in the closed position. Such valves are particularly suitable as compressed gas cylinder valves.

2. Background Information

High pressure valves for compressed gas cylinders have typically been manually operated. In a common type of manually operated high pressure compressed gas cylinder valve, an inner valve stem is spring biased open with respect to a seat formed in the valve body at an inlet from the gas cylinder. The valve is closed by rotating an outer valve stem axially aligned with the inner stem and threadedly received in the valve body to move the inner stem against the spring bias until it creates a seal against the valve body seat. A set of diaphragms between the outer and inner valve stems forms a gas tight seal for the stem. The valves are protected during transportation and storage by a cylindrical transport cap with a hemispherical end which encloses the valve and screws onto a threaded neck on the gas cylinder.

Such valves have proven that they can be operated easily and safely and can remain leak tight for the thousands of cycles. They have performed satisfactorily in hostile environments with high pressure corrosive, toxic, flammable and pyrophoric gases.

It has been found that for certain uses, such as in the semiconductor industry, it is desirable to be able to open and close compressed gas cylinder valves more rapidly than can be accomplished manually and also to be able to control the flow of the compressed gas remotely. At the same time leak integrity requirements are more stringent for such applications and tighter gas purity requirements necessitate cleaner valves as well as cylinders.

It is, therefore, a primary object of the invention to provide a high pressure compressed gas cylinder valve which can be opened and closed rapidly, but which is leak tight, and is easy to keep clean.

It is another object of the invention to provide such a valve which is pneumatically operated.

It is yet another object of the invention to provide such a pneumatically operated valve which can also be operated manually.

It is still another object of the invention to provide such a valve which can be locked in the closed position for storage and travel.

It is another important object of the invention that the present manually operated high pressure valves can be easily converted to pneumatically operated valves which can be manually opened and locked in the closed position.

It is yet another object of the invention that such valves be usable with existing transport caps.

SUMMARY OF THE INVENTION

These and other objects of the invention are realized by a valve having a valve stem member biased toward an open position by a first spring member in the valve chamber and an actuator which pneumatically or manually opens and closes the valve. The pneumatic actuator includes an actuator housing defining an actuator chamber in which a piston is slidable. A second spring member, preferably a stack of disc springs, biases the piston against the valve stem member to move the valve stem member toward the closed position. The force applied to the valve stem member by the second spring member is substantially greater than that applied by the first so that the valve stem member is biased to the closed position. The valve is opened automatically by introducing pneumatic pressure into the actuator chamber to displace the piston away from the valve stem member such that the first spring member moves the valve stem member to the open position. When pneumatic pressure is removed from the actuator, the second spring member returns the valve member to the closed position. Thus, it can be seen that the valve is fail safe in that a loss of pneumatic pressure would cause the valve to snap closed.

The valve also includes manually operated means for opening the valve either when pneumatic pressure is not available or, when manual operation is preferred. A threaded shaft extends through an opening in the top of the actuator housing and is secured to the piston such as by threading the shaft into a bore in a boss on the piston. A nut wrench threaded onto the shaft, bears against the actuator housing as the wrench is turned while the threaded shaft is held stationary by a handle. This draws the piston away from the valve stem member against the bias of the second spring member so that the first spring member can move the valve stem member to the open position.

The pneumatically operated valve of the invention can also be positively locked in the closed position for transport and storage. A removable locking pin is secured, preferably by threads, in the opening in the actuator housing and bears against the piston to clamp the piston against the valve stem member with the valve stem member in the closed position.

The invention is particularly suitable for converting current manually operated high pressure gas cylinder valves into pneumatically operated valves with a manual opening capability and a positive lock for securing the valve in the closed position. In the current valves described above, in which the valve stem member is divided into an inner valve stem in the valve chamber which effects opening and closing of the valve, and an outer valve stem to which the operating handle is attached, with a diaphragm member providing a flexible gas tight seal between the inner and outer valve stems, the outer stem with a threaded shaft and handle is replaced by a stem which extends into the actuator housing and bears against the actuator piston. A nipple on the actuator screws into the same bore as the bonnet on the earlier valves and clamps the diaphragm member in place. The pneumatic actuator is sized so that it can operate a valve on a gas cylinder pressurized to 2500 psi and even higher using a pneumatic pressure less than about 200 psig and yet is small enough that a standard transport cap fits over the valve.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
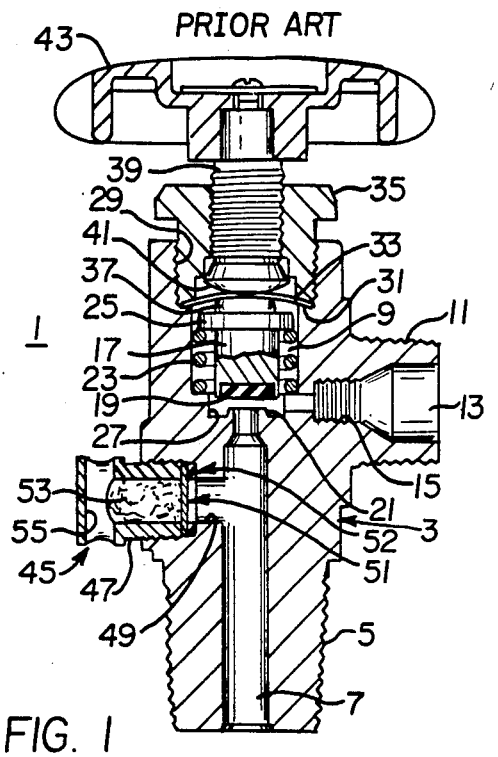
FIG. 1 is a longitudinal sectional view through a prior art high pressure cylinder valve.

While features of the invention are applicable to other types of valves, it will be described as applied to a high pressure gas cylinder valve. A type of presently available high pressure gas cylinder valve is shown in FIG. 1. Such a valve 1 includes a valve body 3 having external threads 5 on one end for securing the valve in the inlet of a high pressure gas cylinder (not shown). A longitudinal bore in the valve body forms an inlet passage 7 which communicates with a concentric bore extending inward from the opposite end of the valve body to form a valve chamber 9. A transverse flared bore through the valve body 3 and an externally threaded boss 11 forms an outlet passage 13 which communicates with the valve chamber 9. The outlet passage 13 is also provided with internal threads 15 for receiving an optional flow restrictor (not shown). The threaded boss 11 is sized to form the appropriate Compressed Gas Association (CGA) connector for the gas being delivered. Standard connection designs are assigned to each gas to avoid misconnections which could result in hazardous conditions.

A cylindrical inner valve stem 17 longitudinally slidable in the valve chamber 9 is recessed at the lower end to receive a valve seat insert 19 which seals against a raised valve body seat 21 surrounding the intersection of the inlet passage 7 with the valve chamber 9. A helical compression spring 23 bears against a radially outwardly extending flange 25 on the inner valve stem 17 and a shoulder 27 in the bottom of the valve chamber 9 to bias the inner valve stem 9 to the open position shown in FIG. 1.

A threaded counterbore 29 forms a shoulder 31 in the valve body concentric with the valve chamber 9. A diaphragm member comprising a set of diaphragms 33 is clamped against this shoulder 31 by an externally threaded bonnet 35 which screws down into the threaded counter bore 29. The number of diaphragms in a set will vary as a function of valve size, choice of materials, design pressure, etc. The diaphragms 33 seal off the valve chamber 9 and bears against the rounded upper end 37 of the inner valve stem 17. An outer valve stem 39 in threaded through the bonnet 35 and has a convex lower surface 41 which bears against the upper surface of the uppermost diaphragm in the diaphragm set 33. The diaphragms 33 it can be seen separate the inner and outer stems to provide a gas tight seal. The outer valve stem 39 is secured to a handwheel 43 for manual operation of the valve. Clockwise rotation of handwheel 43 threads the outer stem 39 downward against the diaphragms 33 to move the inner stem 17 down against the bias of spring 23 until the seat insert 19 seals against the valve body seat 21 to close the valve. When the handwheel 43 is turned counter clockwise to raise the outer stem 39, the spring 23 relaxes and lifts the inner stem 17 raising the seat insert 19 off of the valve body seat 21 to open the valve.

The gas cylinder valve 1 of FIG. 1 may also include a relief device 45, depending on the type of gas in the cylinder, and whether required by Department of Transporation regulations. When required, the relief device 45 is comprised of a hollow plug 47 filled with fusible metal 53 that melts at 165 degrees F. The plug threads into a transverse bore 49 in the valve body 3 on the cylinder side of the valve closure formed by the seat insert 19 and valve body seat 21. A rupture disc 51 is clamped between the inboard face of the plug and a soft metal washer 52. Should the presurrized cylinder be subjected to excessive heat, such as in a fire, the fusible metal 53 will melt when its temperature reaches 165 degrees F. The disc will not rupture until the cylinder pressure reaches the rated burst pressure of the disc. Thus, to relieve the pressure before the safety limits of the cylinder are reached both temperature and pressure of sufficient magnitude are required. A cross passage 55 at the end of the plug 47 divides the discharge flow and provides for balanced thrust forces which eliminates a tendency otherwise to tip the cylinder over.

As previously mentioned, the prior art valve of FIG. 1 has proven very satisfactory over the years and will continue as such in the future; however, in some applications, such as in the semiconductor industry, the system in which the valve operates is to a large degree automatic. For consistency, an automatically operated valve is desirale. Such a valve is also preferable when an immediate need to open or close the valve presents itself; or when hazardous gases are in use and it is important from a personnel safety standpoint to minimize the need for anyone to be near the cylinder when in use.

Figure 2:
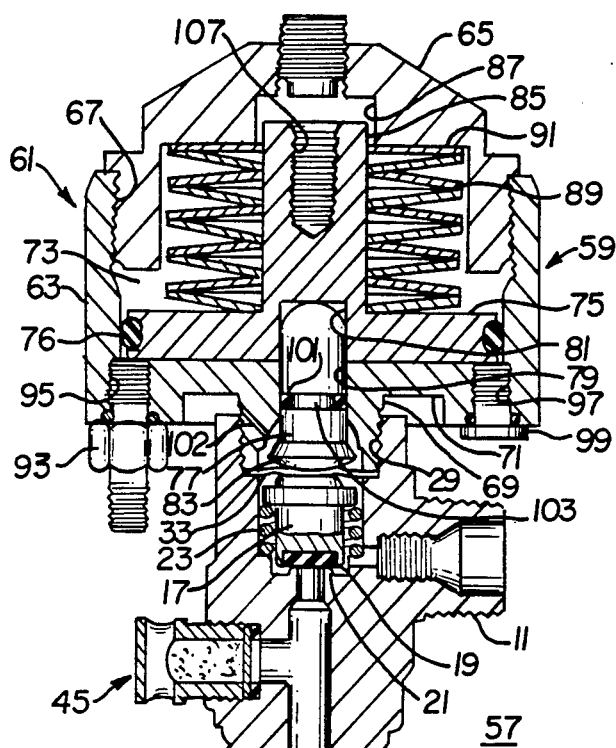
FIG. 2 is a longitudinal sectional view through a pneumatically operated high pressure cylinder valve in accordance with the teachings of the invention configured for automatic operation.

FIG. 2 illustrates a pneumatically operated high pressure gas cylinder valve 57 which meets these criteria. Parts which are identical to those in the valve of FIG. 1 are identified by like reference characters. Thus, the valve 57 has a valve body 3 with an inlet passage 7 and a valve chamber 9 forming a valve body seat 21, and an inner valve stem 17 with a valve seat 19 which is biased away from the valve body seat 21 by helical compression spring 23. The valve 57 also includes diaphragms 33 which seal the top of the valve chamber above the inner valve stem 17. However, the bonnet 35, the outer valve stem 39 which is threaded through it in the valve of FIG. 1 and the handwheel 43 are not required. In their place is a pneumatic actuator 59.

The pneumatic actuator 59 includes an actuator housing 61 comprising a cup shaped member 63 and a housing cover 65 which is secured to the cup shaped member by threads 67. A threaded nipple 69 on the bottom wall 71 of the cup shaped member 63 screws into the threaded counterbore 29 to secure the actuator 59 to the valve body 3 and to clamp the diaphragms 33 which form the gas tight seal for the valve chamber.

The actuator housing 61 defines an actuator chamber 73 in which a piston 75 slides. The piston 75 is sealed against the walls of the actuator chamber by an O-ring 76. An outer valve stem 77 slidable in a bore 79 in the nipple 69 extends into a bore 81 in the piston 75. The convex lower end 83 of the outer valve stem 77 bears against the upper end of the inner valve stem 17 through the diaphragms 33.

A boss 85 on the top of the piston 75 extends upward into a recess 87 in the housing cover 65. A number of disc springs 89 stacked on the boss 85 bear against the top of the piston 75, and through a hardened steel bearing plate 91, the housing cover 65. The disc springs 89 bias the piston 75 downward and with it the outer valve stem 77, and inner valve stem 17 to hold the valve seat insert 19 against the valve body seat 21 and thus seal off flow through the valve.

A connector 93 screwed into a threaded bore 95 in the bottom wall 71 of the actuator housing 61 is connected to a source (not shown) of a suitable compressed gas such as for example air or nitrogen. A second threaded bore 97 in wall 71 angularly spaced from the bore 93 and closed by a plug 99, provides an alternate location for connecting a compressed air line to the actuator. Compressed air introduced through the connector 93 exerts an upward force on the lower side of piston 75 which overcomes the downward force exerted by the disc springs 89 resulting in upward displacement of the piston. This relieves the force exerted through the outer valve stem 77 holding the valve seat insert 19 against the valve body seat 21 so that the spring 23 lifts the inner valve stem 17 to open the valve. The spring forces, and the effective areas of the piston 75 and the outlet of inlet passage 7 are such that a pneumatic pressure of about 160 psig will be suitable to overcome a force exerted by the disc springs 89 which is sufficient to keep the valve closed against a cylinder pressure of 2500 psig. Higher or lower compressed gas systems can be accommodated by the use of stiffer disc springs and higher pneumatic pressure, or more flexible disc springs and lower pneumatic pressure, respectively.

The diaphragms 33 form a seal as mentioned which isolates the environment and the actuator internals from the gas within the valve internals. An O-ring 101 seated in an annular groove 103 in outer valve stem 77 provides a secondary seal between the valve and actuator internals. The O-ring 101 also isolates the diaphragms 33 from the pneumatic pressure underneath the piston 75. Even if there were a leak past the O-ring 101, there would be no pressure buildup against the top of the diaphragms 33 because there is a very small bleed hole 102 through the actuator body just above the diaphragm that would vent any pressure buildup to the atmosphere. A pressure buildup in this region is undesirable because it would tend to keep the valve shut while the pneumatic pressure applied to the underside of the piston is trying to keep the valve open.

Figure 3:
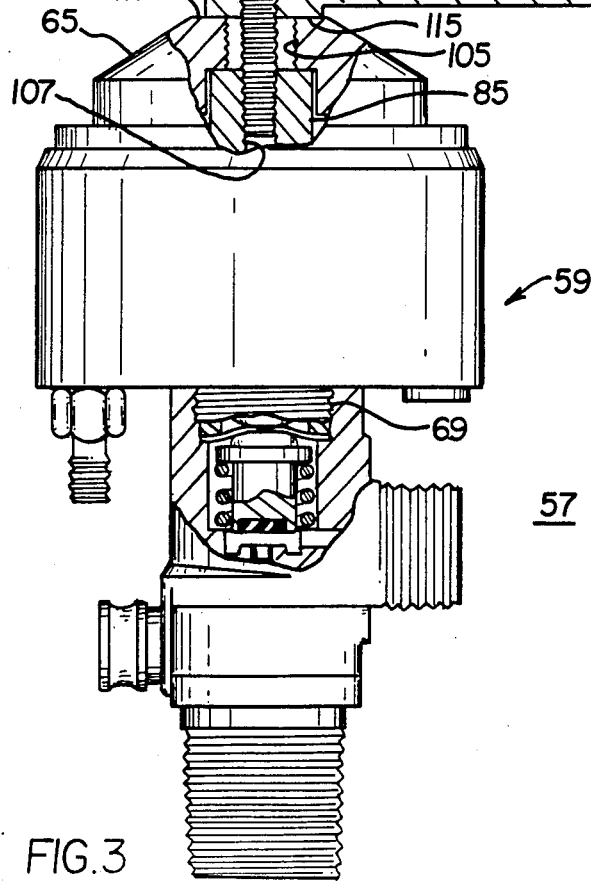
FIG. 3 is an elevation view of the valve of FIG. 2 with some parts sectioned and configured for manual operation.

Without a source of pneumatic pressure applied to the actuator 59, the disc springs 89 keep the valve closed. To provide the capability of opening the valve manually without pneumatic pressure, the housing cover 65 is provided with a central bore 105 aligned with a threaded bore 107 in the top of the boss 85 on piston 75. As shown in FIG. 3, a threaded rod 109 is screwed into the threaded bore 107 using a handle means such as handwheel 111. Once the rod 109 is secured in bore 107, it is held stationary by the handwheel 111 while a nut wrench 113, threaded on shaft 109, is rotated until its flat lower surface 115 comes into contact with a flattened surface 117 on the top of the housing cover 65. Continued clockwise rotation (for a right handed thread on rod 109) of the nut wrench 113 raises the rod 109, which draws the boss 85, and therefore piston 75, upward with it, to compress the disc springs 89. With the piston thus raised, the spring 23 lifts the inner valve stem 17 to open the valve. Friction between the threads on the rod 109 and on the nut wrench 113 maintain the valve in the open position. The valve is closed by rotating the nut wrench 113 counter clockwise to permit the disc springs 89 to lower the piston 75 which in turn moves the valve stems 77 and 17 downward to seal the valve seat insert 19 against the valve body seat 21. The handle 111 can then be turned to remove the rod 109 and with it the nut wrench 113.

Figure 4:
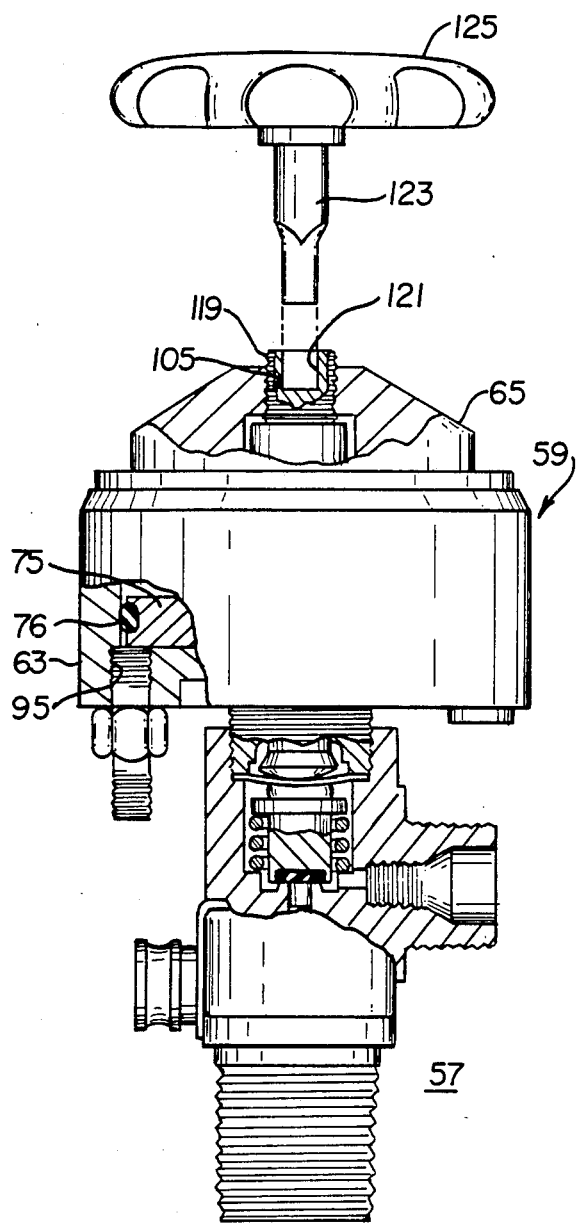
FIG. 4 is a partially exploded elevation view with some parts in section configured for initiating locking of the valve.
Figure 5:
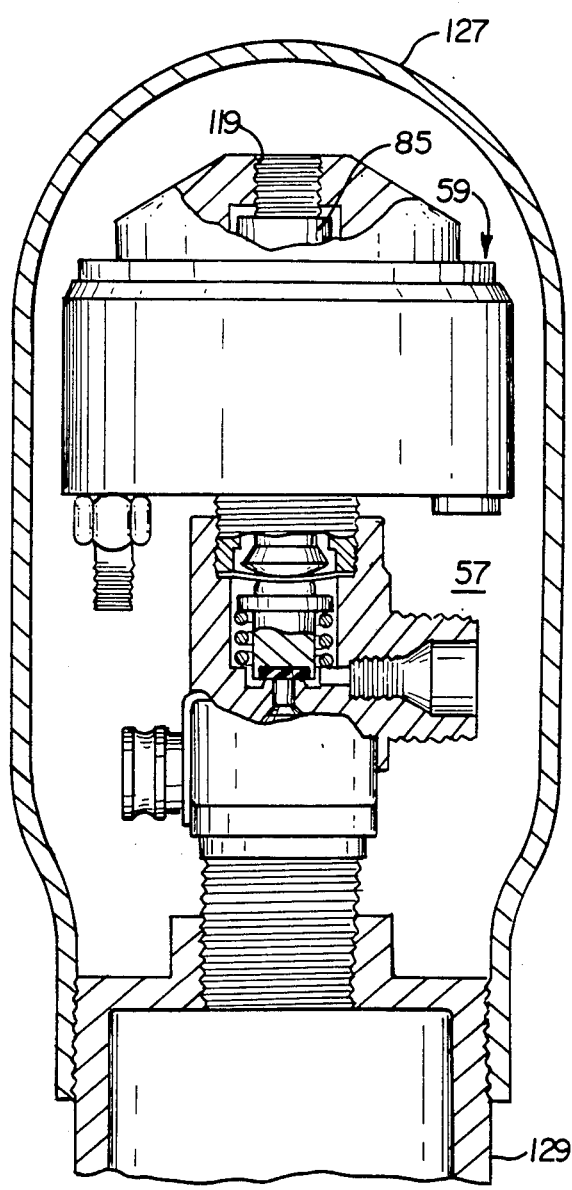
FIG. 5 is an elevation view with some parts in section of the valve in accordance with the invention mounted on a high pressure gas cylinder with a transport cap in place and shown in the locked position.

While the disc springs 89 will maintain the valve closed, it is desirable to have positive mechanical means for locking the valve in the closed position for storage and transportation. Accordingly, the bore 105 in the actuator housing cover is threaded to receive a threaded plug 119 as shown in FIG. 4. This plug 119 has a socket 121 or slot in which is inserted a wrench 123 with a handle 125 or a screw driver. By turning the handle 125, the plug is threaded downward against the boss 85, as shown in FIG. 5, and thus lock the valve in the closed position. As also shown in FIG. 5, a transport cap 127 is threaded onto the gas cylinder 129 on which the valve 57 is mounted to protect the valve during shipment and storage. It is an advantage of the invention, that the pneumatic actuator 59 is sized such that it fits under the standard transport cap 127.

As can be appreciated from the above, current manual gas cylinder valves 1 of the type shown in FIG. 1 can easily be converted in accordance with the invention to pneumatically operated valves which can be manually opened if desired and can be positively locked in the closed position.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A valve comprising a valve body defining an inlet passage and a valve chamber forming together a valve body seat, and an outlet passage communicating with said valve chamber; a valve stem member slidable in said valve chamber between a closed position against the valve body seat and an open position spaced from the valve body seat; first spring means biasing said stem member to the open position; a valve actuator comprising an actuator housing connected to the valve body and defining an actuator chamber into which said valve stem member extends, and actuator piston slidable in said actuator chamber, second spring means biasing said piston against the valve stem member to move the valve stem member toward the closed position, the force applied to the valve stem member by said second spring means being greater than that applied by the first spring means such that the valve stem member is biased to the closed position; means for introducing pneumatic pressure into said actuator chamber to displace said piston away from the valve stem member such that the first spring means moves the valve stem member to the open position; and manually operated means for displacing said piston away from said valve stem member against the force developed by said second spring means such that said first spring means moves said valve stem member to the open position without pneumatic pressure, said actuator housing defining an opening providing access to said piston, and said manually operated means including a threaded shaft which extends through said opening, means for securing the threaded shaft to said piston, handle means for holding said threaded shaft to prevent rotation thereof, and nut wrench means threaded onto the threaded shaft which bears against the actuator housing as the nut wrench is rotated while the threaded shaft is held stationary by the handle means to move the piston away from the valve stem member against the bias of the second spring means such that the first spring means moves the valve stem member to the open position.

2. The valve of claim 1 wherein said actuator housing defines an opening providing access to said piston, and wherein said manually operated means includes a threaded shaft which extends through said opening, means for securing the threaded shaft to said piston, handle means for holding said threaded shaft to prevent rotation thereof, and nut wrench means threaded onto the threaded shaft which bears against the actuator housing as the nut wrench is rotated while the threaded shaft is held stationary by the handle means to move the piston away from the valve stem member against the bias of the second spring means such that the first spring means moves the valve stem member to the open position.

3. The valve of claim 1 including means for locking the valve closed and comprising rigid means engaging the actuator housing and clamping said piston against said valve stem member with the valve stem member in the closed position.

4. The valve of claim 3 wherein said actuator housing defines a threaded bore aligned with said piston and said rigid means comprises a plug threaded into said threaded bore and bearing against the piston to clamp the piston against the valve stem member with the valve stem member in the closed piston.

5. In a high pressure gas cylinder valve for use with a high pressure gas cylinder, said valve having: a valve body threaded onto the top of the gas cylinder and defining a valve inlet passage aligned with and in communication with the gas cylinder, a bore forming a valve chamber aligned with the valve inlet passage and defining therewith a valve body seat, and an outlet passage communicating with the valve chamber; an inner valve stem axially slidable in the valve chamber between a closed position wherein it seats against the valve body seat and an open position wherein it is displaced from the valve body seal such that the inlet passage communicated with the outlet passage through said valve chamber; first spring means biasing said inner valve stem to the open position; a diaphragm member in said bore in the valve body sealing the valve chamber and movable with the inner valve stem the improvement comprising: an actuator housing having a threaded nipple which threads into the bore in the valve body, said housing defining an actuator chamber; a piston slidable in said actuator chamber, an outer valve stem extending through said nipple and bearing at one end against one side of the piston and at the other end against the diaphragm member second spring means bearing against the other side of said piston, said second spring means generating a force which is transmitted through the piston, the outer valve stem and the diaphragm member to the inner valve stem to overcome the force generated by the first spring means and bias the inner valve stem to the closed position, means in the actuator housing through which a pressurized gas is introduced into the actuator chamber to bear against the first side of said piston and move said piston away from the second stem member against the bias of said second spring means such that the first spring means moves the inner valve stem to the open position, said actuator housing defining a bore aligned with the piston, a locking pin, means for removably securing said locking pin in the bore in the actuator housing to bear against the actuator piston and positively lock said inner valve stem in the closed position, and removable means for manually opening said cylinder valve without a pressurized gas, said removable means comprising: a threaded shaft which extends through the bore in the actuator housing, means for securing the threaded shaft to the piston, handle means for holding said threaded shaft to prevent rotation thereof, and nut wrench means threaded onto said threaded shaft and bearing against the actuator housing as the nut wrench is rotated while the threaded shaft is held stationary by the handle means, to draw the piston away from the outer valve stem against the bias of said second spring means such that the first spring means moves the inner valve stem to the open position.

6. The cylinder valve of claim 5 wherein said bore in the actuator housing is threaded and wherein the means for removably securing the locking pin in said bore comprises threads on the locking pin which engage the threads in the bore.

7. The cylinder valve of claim 5 including means for manually opening said cylinder valve without a pressurized gas, said means comprising: a threaded shaft which extends through the bore in the actuator housing, means for securing the threaded shaft to the piston, handle means for holding said threaded shaft to prevent rotation thereof, and nut wrench means threaded onto said threaded shaft and bearing against the actuator housing as the nut wrench is rotated while the threaded shaft is held stationary by the handle means, to draw the piston away from the outer valve stem against the bias of said second spring means such that the first spring means moves the inner valve stem to the open position.

8. The cylinder valve of claim 6 wherein said actuator piston includes a cylindrical boss extending from said other side thereof toward said axial bore in the actuator housing, and wherein said second spring means comprise disc springs concentrically mounted on said cylindrical boss on said actuator piston.

9. The cylinder valve of claim 8 wherein said means for securing said threaded shaft to said piston comprise a threaded bore in said boss into which said threaded shaft is screwed.

10. A manually operable pneumatic actuator for a gas cylinder valve having a valve body defining a valve chamber and a threaded bore forming with the valve chamber a shoulder, an inner valve stem slidable in the valve chamber between a valve open and a valve closed position, a first spring within the valve chamber biasing the inner valve stem to the open position, and a diaphragm member seated on said shoulder and forming a flexible gas seal for the valve chamber and inner stem, said actuator comprising:

an actuator housing having a threaded nipple which threads into said threaded bore in the valve body to clamp said diaphragm member against said shoulder, said housing defining an actuator chamber aligned with the valve chamber, a piston slidable in said actuator chamber, an outer valve stem slidable in said nipple and bearing at one end against one side of said piston and at the other end against said flexible diaphragm member which contacts the inner valve stem, a boss extending from the other side of said piston, a set of disc springs stacked on said boss to bias the piston against the outer valve stem and thereby move the inner valve stem toward the closed position, the force generated on the inner valve stem by the disc springs being greater than the force applied by the first spring such that the inner valve stem is biased to the closed position, connector means for introducing pressurized pneumatic fluid into the actuator chamber on the first side of said piston to move the piston away from the outer valve stem such that the first spring moves the inner valve stem to the open position, and means for manually opening said valve comprising a threaded bore defined by said boss on the piston, an opening defined by the actuator housing in alignment with said threaded bore in said boss, a threaded shaft threaded into the threaded bore in said boss and extending out through said opening in the actuator housing, a handle on said threaded shaft, and a nut wrench threaded onto said threaded shaft and bearing against the actuator housing as said nut wrench is rotated while said threaded shaft is held stationary by said handle to draw the piston away from said outer valve stem against the bias of the disc springs such that the first spring moves the inner valve stem to the open position without pressurized pneumatic fluid.

11. The pneumatic actuator of claim 10 including locking means for rigidly clamping said inner valve stem in the closed position and wherein said opening in the actuator housing defines a threaded passage, said locking means comprising a removable threaded plug screwed into said threaded passage in place of said threaded shaft and bearing against said boss to clamp said piston down against the outer valve stem with the inner valve stem in the closed position.

* * * * *

UNITED STATES PATENT AND TRADEMARK OFFICE
CERTIFICATE OF CORRECTION

PATENT NO.  : 4,706,929
DATED       : November 17, 1987
INVENTOR(S) : William S. Kalaskie and David E. Hughes It is certified that error appears in the above-identified patent and that said Letters Patent is hereby corrected as shown below:

Col. 7, line 49, change "seal" to --seat--; line 50, change "communicated" to --communicates--; line 54, insert a comma after "stem".

Signed and Sealed this

Seventeenth Day of May, 1988

Attest:

DONALD J. QUIGG

*Attesting Officer*        *Commissioner of Patents and Trademarks*